United States Patent [19]

Adams

[11] Patent Number: 4,467,490

[45] Date of Patent: Aug. 28, 1984

[54] AIRFOIL SURFACE MULTISTATE PRECIPITATION REMOVAL TOOL

[76] Inventor: Bruce M. Adams, 704 Felipe Pl., Santa Fe, N. Mex. 87501

[21] Appl. No.: 452,384

[22] Filed: Dec. 22, 1982

[51] Int. Cl.³ .............................. B60S 3/00; A47L 1/06
[52] U.S. Cl. ........................................ 15/105; 15/121; 15/236 R; 15/245
[58] Field of Search ................. 15/105, 111, 114, 118, 15/121, 236 R, 245

[56] References Cited

U.S. PATENT DOCUMENTS

| | | | |
|---|---|---|---|
| 2,904,806 | 9/1959 | Obergfell | 15/105 |
| 2,904,807 | 9/1959 | Obergfell | 15/105 |
| 2,946,076 | 7/1960 | Morgan | 15/236 R |
| 3,091,790 | 6/1963 | Schroeder | 15/105 |
| 3,540,071 | 11/1970 | Jorgensen | 15/105 |
| 3,787,921 | 1/1974 | Feldmann | 15/105 |

Primary Examiner—Edward L. Roberts
Attorney, Agent, or Firm—Samuel M. Freund

[57] ABSTRACT

A multistate aqueous precipitation removal tool designed to remove light ice, snow, slush, and liquid water from delicate aircraft airfoil surfaces, and to polish frost thereon without harming such surfaces. Materials of appropriate hardness and flexibility over a broad range of temperatures have been located and incorporated into a scraping/polishing/squeegeeing/shoveling tool for use in the aircraft industry for preparing aircraft for take-off after precipitation has occurred. When used for snow removal, the tool head is designed so that the snow being pushed ahead of the tool weights the head thereby forcing the scraping blade in closer contact with the surface operated on. This feature improves the efficiency of the instant invention for snow and ice removal while reducing operator fatigue since little downward pressure need be applied to the tool handle.

33 Claims, 6 Drawing Figures

AIRFOIL SURFACE MULTISTATE PRECIPITATION REMOVAL TOOL

BACKGROUND OF THE INVENTION

The present invention relates generally to scrapers for removing a variety of materials and more particularly to bladed, antiscratch, multistate water precipitation removing tools for delicate aircraft airfoil surfaces. A frame, a handle, and a plurality of scraping members comprise my tool and permit the removal of snow, slush, ice, frost, and water from such surfaces, and the polishing of more-difficult-to-remove frost thereon, without any damage thereto.

Removal of snow, ice, frost, and slush from airplane airfoil surfaces is a well known flight safety necessity. As serious as the additional weight burden imposed by solid-state precipitation is the associated destruction of lift caused by (1) frost, snow, and ice disrupting the laminar flow of air over wing and tail surfaces, and (2) the resulting increase in parasitic drag produced by the rough airfoils. A mere 1/16" of rough, heavy frost, for example, can markedly reduce the boundary layer kinetic energy of air moving over a wing, disastrously decreasing lift. However, this same 1/16" of frost, once polished, has much less effect on aircraft performance. Two options then exist: (1) removing all precipitation from the wing surface (the preferred method); or (2) polishing smooth by mechanical means any residual frost that cannot be completely removed from wings and stabilizers. Large, commercial airline companies generally employ chemical deicers. That is, alcohols or other deicing chemicals, often heated, are sprayed on the wing and tail surfaces. However, these fluids are too heavy to carry on board an airplane in quantities necessary for effective deicing of large wings and tails and are also dangerous to transport. Unfortunately, small and/or remote airfields do not ordinarily have the required deicing agents or spray equipment. Corporate and private aircraft owners, therefore, have had in the past to utilize relatively crude mechanical means (e.g., brooms, rope, burlap bags, and even the edges of credit cards) for snow and ice removal. Also, in the past, water and slush have had to be removed by primitive means (e.g., compressed air, rags, industrial floor squeegees, and mops) because liquids left on airfoils will turn to ice as an airplane taxis or takes off but specialized implements were not available for such tasks.

Pending U.S. patent application Ser. No. 424,388 "Multistate Precipitation Removal Tool" filed Sept. 27, 1982 by Bruce M. Adams, the disclosure of which is hereby incorporated herein by reference, describes several embodiments of a precipitation removal tool fabricated from elastomeric and silicone rubber materials which maintain their flexibility and hardness characteristics over the broad temperature range for which airfoil deicing is necessary. The preferred embodiment of tool of the present invention has some of its scraping members fabricated out of the same materials, but is designed to be more efficient for larger airfoils than the tool taught therein. It has larger scraping and squeegeeing edges so that a stiff frame or support is required to hold the more flexible scraping members in the correct orientation. Moreover, the tool head shape has been chosen to provide another efficient snow-shoveling capability. That is, the obtuse angle of the supporting frame permits the operator of the tool to use handles of substantial length without having to exert large downward force on the tool head when removing snow since the weight of the snow forces the tool head against the airfoil surface. Patent application Ser. No. 424,388 describes further the commercially available elastomers with properties between plastics and rubbers, and silicone rubber, which have been found to be particularly effective as scraping blade members for removing ice, snow, water, and slush from delicate surfaces and polishing difficult-to-remove frost thereon without damage to these surfaces. E. I. duPont de Nemours and Co. Tradename 'Hytrel' polyester elastomers are available in compositions soft enough to squeegee water from shaped surfaces, in compositions of intermediate flexibility suitable for polishing frost thereon, and in compositions hard enough to scrape off crusty snow and light ice without damaging airfoil surfaces over the important temperature range which includes ground temperatures most often encountered during and after winter storms, i.e., from about 0° to −40° C. Dow Corning DC55 silicone rubber has been useful for the preferred embodiment of the instant precipitation removal tool as the squeegee blade member.

Three relevant bulletins from E. I. duPont de Nemours and Co. describe the 'Hytrel' product line: HYT-501A, "Mechanical Properties of 'Hytrel'"; HYT-001A, "Types, Properties, and Uses of 'Hytrel'"; and E-26276, "Engineering Guide to the duPont Elastomers," the disclosures of which bulletins are hereby incorporated herein by reference. The third of these publications lists 23 uses for these materials, none of which includes my invention. Although these bulletins list the properties of 'Hytrel', these properties should not be regarded as restricting the materials from which my tool is fabricated to 'Hytrel'.

The following items are also believed to be important:

1. U.S. Pat. No. 2,904,806 and U.S. Pat. No. 2,904,807, both issued to H. Obergfell on Sept. 22, 1959 describe window cleaners with a plastic scraping member and a rubber squeegee member. The claims recite window cleaner elements or members, respectively, which when read in view of the spectifications, teach plastics which do not scratch glass and rubber squeegee blades. No mention is made of the temperature range for which the invention is to be used. Since most plastics and rubber compounds will not scratch glass, but most will damage delicate airfoil surfaces, especially at low temperatures, the present invention is believed to be nonobvious over these patents. Therefore, most plastics and rubber materials suitable to the window cleaning arts are unsuitable for the purpose intended for my invention. Further, all of the scraping members of my tool are able to ride over rivets and other small protrusions located on airfoil surfaces without damage either to the tool or to the protrusions. Moreover, the particular design using certain obtuse angles for the relative location of the two stiffer scraping members of the present invention, and the particular range of widths, lengths and thicknesses selected for the rectangular regions of the tool head has been found to permit the use of long handles when the tool is used for snow removal since the weight of the snow forces the snow removal scraping member into close contact with the airfoil surface to be cleaned. Finally, an intermediate flexibility and hardness blade member in a particular design of my tool is useful for removing and/or polishing frost. This scraping member is applied in a substantially perpendicular manner to the surface. Both Obergfell patents show squeegee and scraping members angled forwardly. Frost polishing is not a function that a window cleaning tool would be expected to perform, and indeed there are no teachings in the Obergfell patents directing one to such a function.

2. U.S. Pat. No. 3,540,071 issued to I. W. Jorgensen on Nov. 17, 1970 for a cleaning tool and U.S. Pat. No. 3,787,921 issued to Robert G. Feldmann on Jan. 29, 1974 both teach an abrasion resistant automobile scraping member and a resilient or flexible wiping member. Again, no mention is made of a particular choice of blade materials which would allow the use of this cleaning tool for delicate airfoil surfaces. The only stated caution for the choice of the scraping members is that they will not scratch nor mar glass surfaces. Further, as discussed hereinabove for the Obergfell patents, no teachings nor claims are provided therein for polishing frost thereon, nor riding over small protrusions affixed thereto (e.g., rivets), nor for efficiently removing snow from such surfaces. In fact, the use of the same material for all members of the complicated frame of Jorgensen's and Feldmann's scraping tools as are used for the ice scraping members, which are both further shown to possess a sharp edge, teaches away from the present invention which teaches the use of softer and more flexible blade members which generally cannot retain sharp edges and are, in fact, designed so as not to incorporate them. Finally, both the scraping and squeegeeing members of Jorgensen's and Feldmann's tools are angled forwardly. This is significantly different from the requirements of the present invention.

3. U.S. Pat. No. 3,773,375 issued to George R. Nehls on Nov. 20, 1973 teaches a snow removal device with one metallic scraping blade and one rubber blade substantially in-line. Since the Nehls patent teaches a metallic scraping member, this patent teaches away from the present invention of a scraper/squeegee/polisher tool.

4. Finally, U.S. Pat. No. 2,946,076, issued to Sidney C. Morgan on July 26, 1960, describes a U-shaped ice-scraping tool constructed of a single material such as vinyl plastic, hard rubber, or sheet Plexiglas which will not scratch glass. This patent does not teach the present invention because: (1) vinyl plastics and Plexiglas will damage airfoil surfaces; (2) hard rubber, when cold, is of value only for scraping ice and pushing snow; and (3) the U-shaped ice scraping head is not well suited for removing snow or squeegeeing liquid accumulations from large surfaces.

SUMMARY OF THE INVENTION

One object of the instant invention is to provide a tool for removing crusty snow and light ice from delicate airfoil surfaces such as wings without damaging them.

Another object of my invention is to provide a tool for polishing frost on delicate wing surfaces such that boundary layer turbulence resulting from such frost is minimal, again without damage to the surfaces being operated on.

Yet another object of the present invention is to provide a tool for squeegeeing water and slush from delicate surfaces without damaging them.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the tool of this invention includes an elongated head mounted perpendicularly at the end of an elongated handle, the head having a V-shaped cross section opening forwardly away from the handle, each leg of the "V" forming a rectangular section, each of which contains an outer edge parallel to that of the other and to the apex line of the "V", the handle being attached to one of the rectangular sections at about its midpoint, the tool further having two scraping members rigidly and demountably attached such that one scraping member extends outwardly beyond each of the two outer edges of the head, the stiffer of the scraping members being suited to scraping snow and ice from delicate aircraft airfoil surfaces without damage thereto, and the other, more flexible scraping member, being suited to polishing frost on such surfaces also without damage thereto, this more flexible blade being rigidly and demountably attached to the rectangular section which has the handle attached such that the blade is located in a substantially perpendicular manner relative to the handle. Preferably, the stiffer scraping member includes a rectangular sheet fabricated from at least one material having a room temperature Durometer hardness value included in the range from approximately 63D to 72D, which hardness value changes by less than about 10% over the temperature range from approximately 0° to −40° C., and having a temperature Clash-Berg Modulus of Rigidity included in the range from about 13,500 psi to 19,000 psi which modulus changes by less than a factor of about seven (7) over the temperature range from approximately 23° to −40° C. Preferably also, the softer scraping member includes a rectangular sheet fabricated from at least one material having a room temperature Durometer hardness value included in the range from approximately 40D to 55D, which hardness value changes by less than about 13% over the temperature range from approximately 0° to −40° C., and having a room temperature Clash-Berg Modulus of Rigidity included in the range from about 2100 to 8800 psi, which modulus changes by less than a factor of about four (4) over the temperature range from approximately +23° to −40° C.

The physical dimensions of the stiff and softer scraping members are preferably chosen such that the weight of the snow presses the tool head onto the wing surface when the tool is pushed in a forward direction against such snow; that is, the tool head is wide enough to prevent the snow from riding over the head until a desired amount of snow is collected forward of the tool. Further, both blades must be able to safely ride over rivets and other small protrusions on the airfoil surface. It is also preferred that a softer squeegee blade can be removably and rigidly fastened on either side of the frost polishing blade for removing water and slush from airfoil surfaces and for whisking solid precipitation loosened by the application of either of the two stiffer blades. It is preferred that the squeegee blade extend slightly beyond the scraping edge of the polishing blade to which it is attached in order to permit the most efficient removal of heavy snow, slush, and frost with one motion of the polishing blade (which is achieved with the blade substantially perpendicular to the airfoil surface), while simultaneously allowing the squeegee blade to remove liquids on the return stroke of the tool, resulting in a scraping/squeegeeing action by the combined blades. It is preferred that the squeegee blade include rectangular sheet fabricated from at least one material having a room temperature Durometer hardness value in the range from approximately 40A to 60A.

In a further aspect of the present invention, in accordance with its objects and purposes, the tool hereof also may include an elongated head mounted perpendicularly at the end of an elongated handle, the head having a V-shaped cross section opening forwardly away from the handle, each leg of the "V" forming a rectangular section each of which contains an outer edge parallel to that of the other and to the apex line of the "V", the handle being attached to one of the rectangular sections at about its midpoint, the tool further having a first, stiffer and harder scraping member useful for scraping snow and ice from delicate aircraft surfaces without damage thereto formed from the rectangular section which is not attached to the handle, the head and this scraping member being of unitary construction, the outer edge of the rectangular section being the scraping edge of the scraping member, and having a second, softer and more flexible scraping member suitable for polishing frost on such surfaces also without damage thereto, this seemed scraping member being attached to the rectangular section which has the handle attached such that the blade is located in a substantially perpendicular manner relative to the handle. Preferably, the stiffer scraping member and head are fabricated from at least one material having a room temperature Durometer hardness value included in the range from approximately 63D to 72D, which hardness value changes by less than about 10% over the temperature range from approximately 0° to −40° C., and having a room temperature Clash-Berg Modulus of Rigidity included in the range from about 13,500 psi to 19,000 psi which modulus changes by less than a factor of about seven (7) over the temperature range from approximately +23° to −40° C. Preferably also, the softer scraping member includes rectangular sheet fabricated from at least one material having a room temperature Durometer hardness value included in the range from approximately 40D to 55D, which hardness value changes by less than about 13% over the temperature range from approximately 0° to −40° C., and having a room temperature Clash-Berg Modulus of Rigidity included in the range from about 2100 to 8800 psi, which modulus changes by less than a factor of about four (4) over the temperature range from +23° to −40° C.

The physical dimensions of the stiff and softer scraping members preferably are chosen such that the weight of the snow presses the tool head onto the wing surface when the tool is pushed in a forward direction against such snow; that is, the tool head is wide enough to prevent the snow from riding over the head until a desired amount of snow is collected forward of the tool. Further, both blades must be able to safely ride over rivets and other small protrusions on the airfoil surface. It is also preferred that a softer squeegee blade can be removably and rigidly fastened on either side of the frost polishing blade for removing water and slush from airfoil surfaces and for whisking solid precipitation loosened by the application of either of the two stiffer blades. Preferably, the squeegee blade extends slightly beyond the scraping edge of the polishing blade to which it is attached in order to permit the most efficient removal of heavy snow, slush, and frost with one motion of the polishing blade (which is achieved with the blade substantially perpendicular to the airfoil surface), while simultaneously allowing the squeegee blade to remove liquids on the return stroke of the tool, resulting in a scraping/squeegeeing action by the combined blades. It is preferred that the squeegee blade include rectangular sheet fabricated from at least one material having a room temperature Durometer hardness value in the range from approximately 40A to 60A.

The tool of the present invention, then, provides a means for removal of snow, slush, freezing rain, and light ice from extended, delicate airfoil surfaces, and for removing and polishing frost thereon without damaging such surfaces. Moreoover, my tool is capable of riding over rivets and other small wing surface protrusions while substantially conforming to the wing surface. This combination of capabilities in a nondestructive tool is of critical importance in the aircraft industry. Although there are numerous scraper designs for removing ice and snow from automobile windscreens, many combined with squeegee blades for slush and water removal, none of these scrapers are suitable for use on delicate airfoil surfaces, especially in the low temperature range where mechanical airfoil precipitation removal is usually performed. The only characteristic of the ice scraper blades taught in the patent literature is that they should not scratch window glass. Since most plastics cannot scratch glass, but all hard plastics will damage delicate airfoil surfaces, the choice of materials which combine the properties of plastics with those of rubbers represents an advancement in the scraper art.

BRIEF DESCRIPTION OF THE DRAWINGS

The accompanying drawings, which are incorporated in and form a part of the specification, illustrate one embodiment of the present invention and, together with the description, serve to explain the principles of the invention. In the drawings.

DETAILED DESCRIPTION OF THE INVENTION

Figure 1:
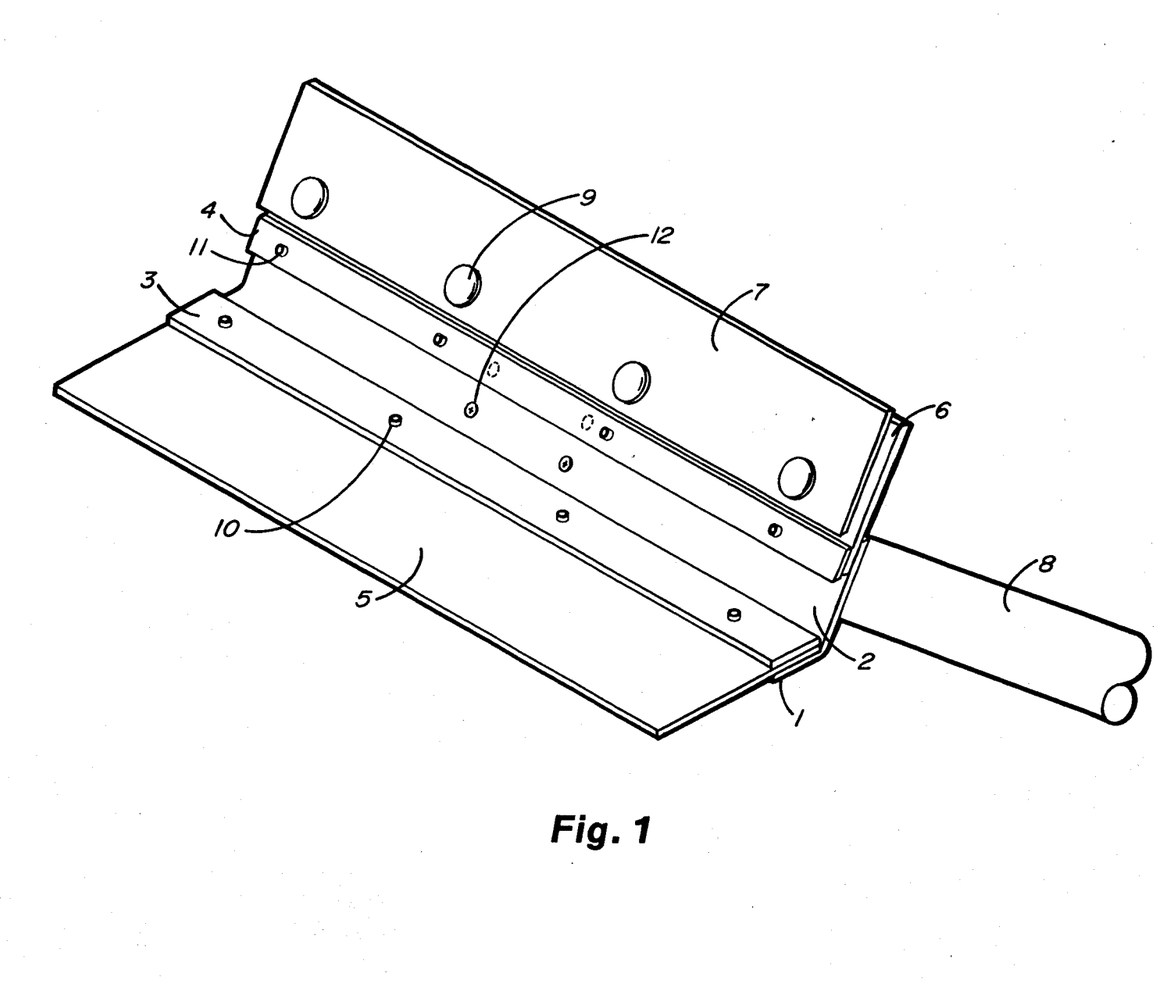
FIG. 1 shows a perspective view of the V-shaped head of the precipitation removal tool of the instant invention with the three blade members in place.

Referring now in greater detail to the figures, FIG. 1 shows a perspective view of the V-shaped head of my precipitation removal tool. A rectangular frame is bent at an obtuse angle along its larger dimension forming two smaller rectangular regions 1, 2. The first of these regions 1, forms, together with tapped rectangular clamping member 3 and screws 10, a clamp which rigidly and demountably holds the snow and ice removing blade member 5. A similar clamping arrangement 2, 4, 11, rigidly and demountably locates the frost polishing blade member 6. A soft, squeegee blade 7 is rigidly and demountably affixed to either side of the polishing blade 6, depending on whether it is desired to have the squeegee action while pushing or pulling the tool across the surface acted upon, by fastening means 9. The handle 8 is mounted perpendicular to the rectangular region 2 which supports the polishing blade member 6, in the direction away from the opening of the V-shaped head, by fastening means 12 which hold a receptacle 13 (not shown, see FIG. 2). The perpendicular arrangement is maintained since frost removal and/or polishing is more efficient with the polishing blade member 6 oriented perpendicularly to the airfoil surface operated on, which orientation is most easily achieved when the handle is held parallel to this surface.

Figure 2:
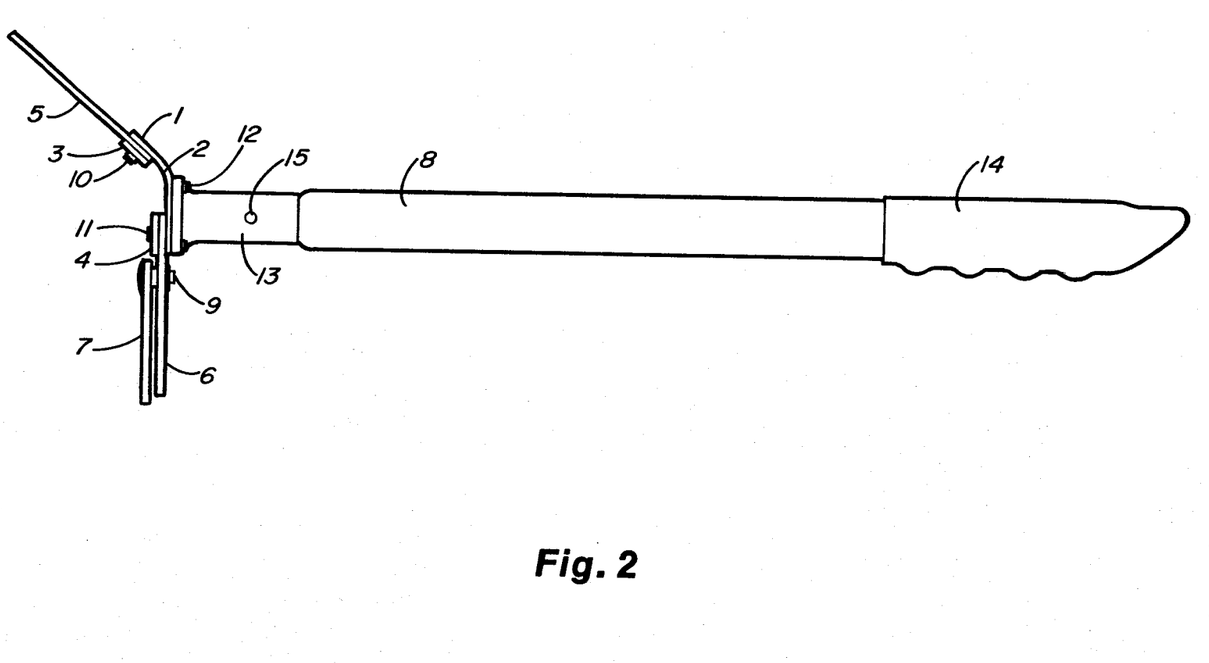
FIG. 2 shows a side view of the entire tool, particularly showing the relationshlp between the handle and the tool head.

FIG. 2 shows a side view of the entire tool. A plastic handgrip 14 is attached to the end of the handle 8 away from the tool head to facilitate pushing and pulling the tool across surfaces to be operated on. In the preferred embodiment of the invention shown in the drawings, the forward end of the handle 8 fits inside of a receptacle 13 which has a similar inside diameter to the outside diameter of the forward end of the handle. Two depressible spring-loaded locating pins removably fix the position of the handle once they find locating holes 15. The receptacle 13 is attached to rectangular area 2 by fastening means 12.

Figure 3:
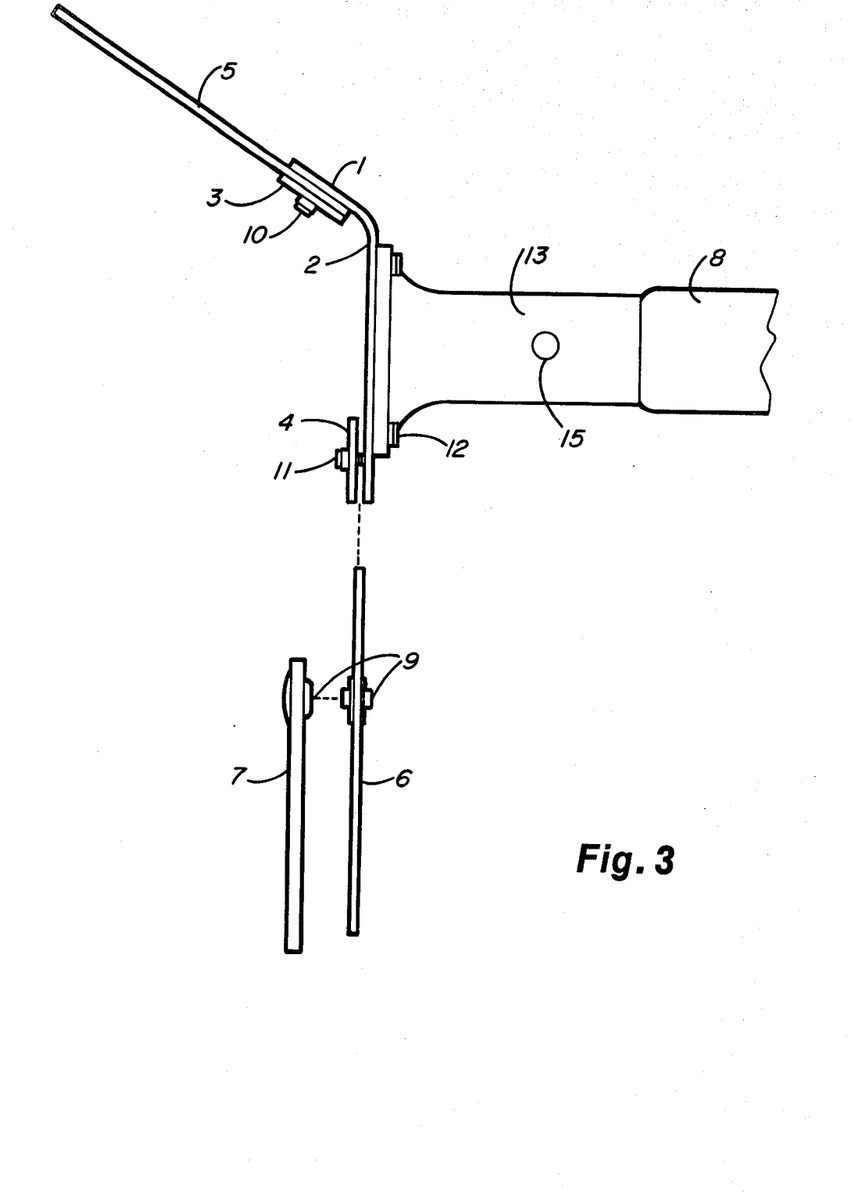
FIG. 3 shows an enlarged and exploded side view of the tool head.

FIG. 3 shows an enlarged and exploded side view of the tool head. In particular, the double-sided snap fasteners 9 are shown which allow the placement of the squeegee blade 7 on either side of the polishing blade 6, in the preferred embodiment of the present invention. Fastening means 10 and 11 are flat-head screws inserted through recessed clearance holes in rectangular regions 1 and 2, respectively, and screwed into tapped holes in rectangular clamping members 3 and 4, respectively.

Figure 4:
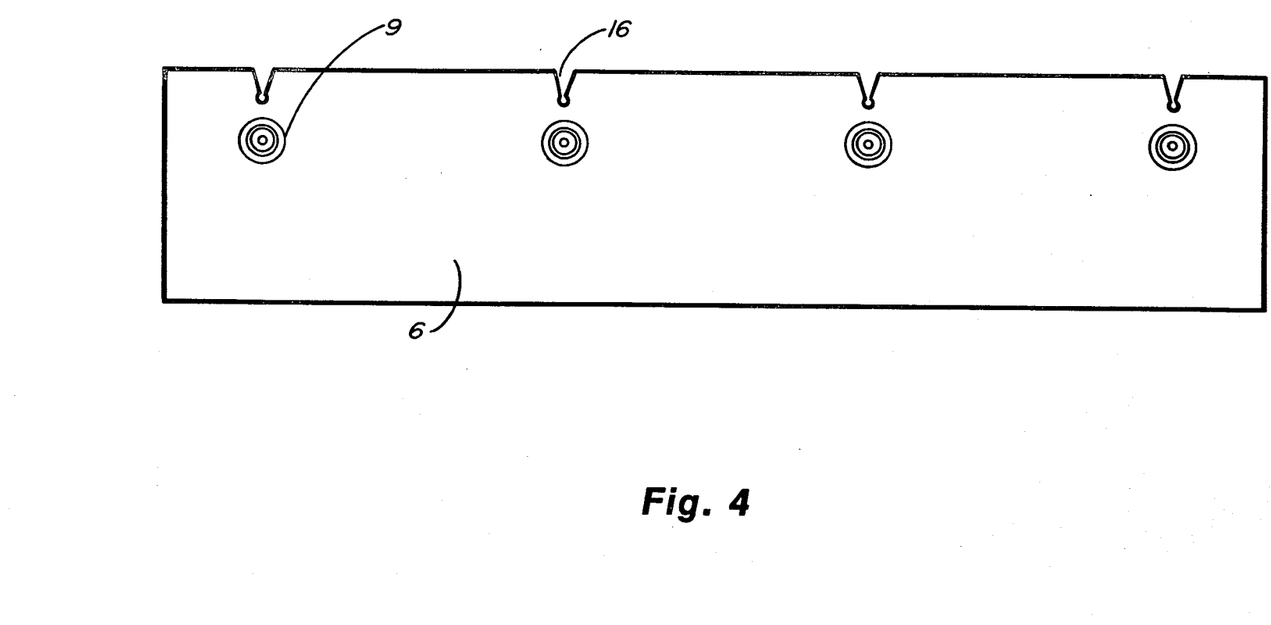
FIG. 4 shows a front view of the frost polishing blade member.

FIG. 4 shows a front view of the frost scraping member 6. Shown are the locating slots 16 which permit the changing of blade members using only two hands. A similar slot arrangement obtains for the snow and ice scraping blade 5. The holes are clearance size for the fastening screws. However, the V-shaped portion of the slots narrows to a smaller dimension than the screws. Since all of the blade members are relatively flexible, the blades can be pushed past the screws, thereby loosely locating them between the rectangular frame regions and the clamping members. The clamp fastening means can then be tightened, rigidly locating the blade. Shown also are the double-sided snap fasteners 9.

Figure 5:
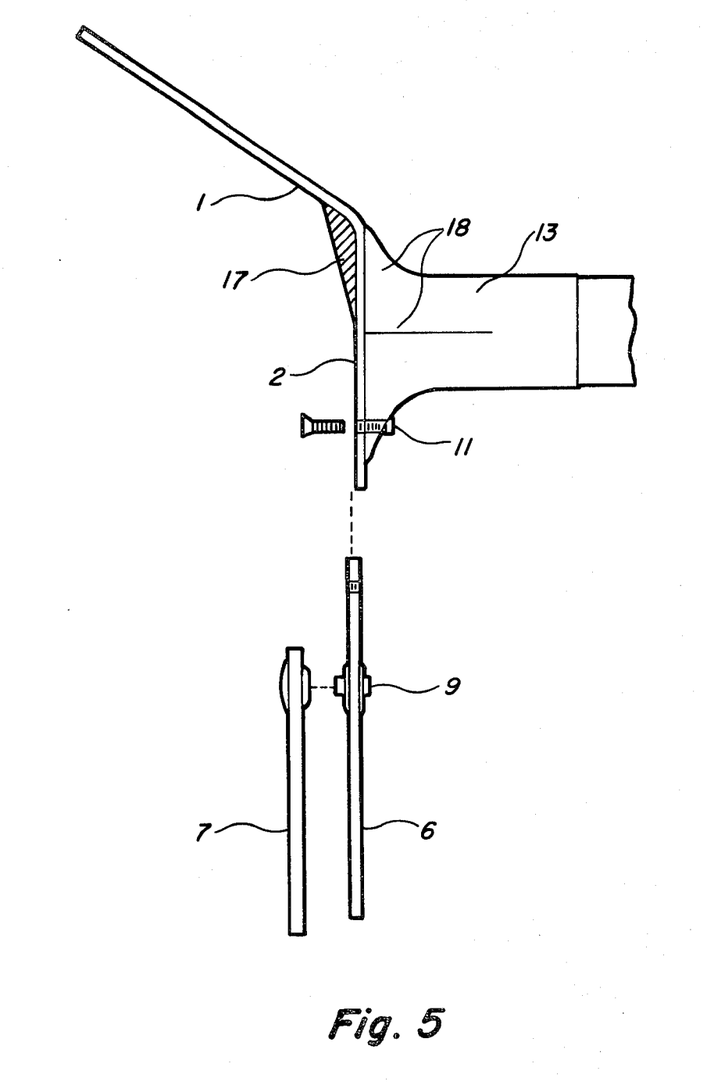
FIG. 5 is a side view of another embodiment of my invention showing a unitary construction of the head and stiffer blade member and showing ribs and strengthening and stiffening members.

FIG. 5 is a side view of a second embodiment of the tool of my invention. The handle receptacle 13, the first rectangular region 1, the second rectangular region 2, and the snow and ice removing blade member 5 (see FIG. 2) are all formed from a common material and are of unitary construction. That is, the first rectangular region 1 serves as the snow and ice removing blade member in this embodiment. Ribs 17 and stiffening and strengthening members 18 reinforce the head to permit a saving in the use of material having the desired characteristics which have tended to be expensive.

Figure 6:
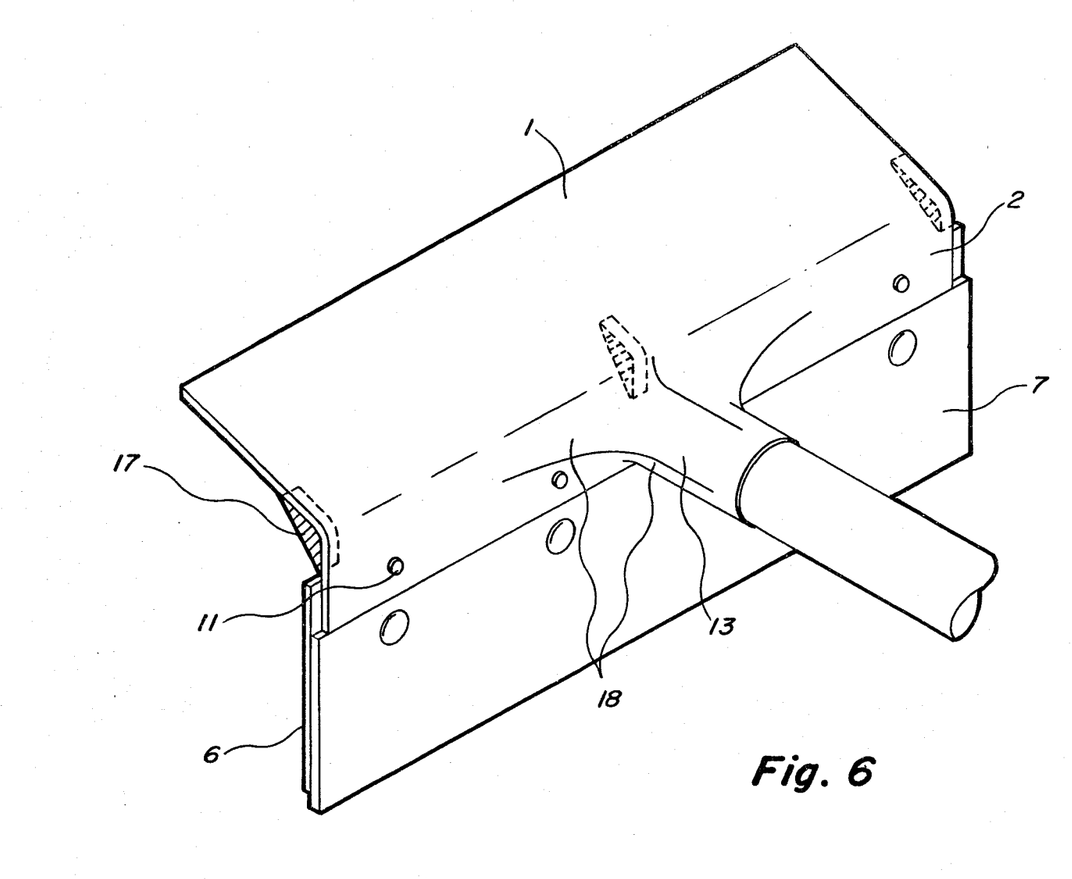
FIG. 6 shows a perspective view of the embodiment of the present invention described in FIG. 5 with all blade members attached.

FIG. 6 is a perspective view of the assembled second embodiment of my invention showing the relative positions of the constituent parts.

Reference will now be made in detail to the present preferred embodiment of the invention, an example of which is illustrated in the accompanying drawings. The scraping blades described hereinabove were made from injection molded DuPont 'Hytrel' polyester elastomers. The stiff snow and ice scraping blade had a room temperature Durometer hardness value of 72D, while the polishing blade had a room temperature Durometer hardness value of 55D. These Durometer values characterize the mechanical properties of the blades according to DuPont bulletin HYT-501A, supra. Both blades were approximately 3"×12"×0.085", and extended about 2¼" from the edge of the frame. The squeegee blade was fabricated from about 2¾"×12"×0.125" Dow Corning DC55 silicone rubber which had a room temperature Durometer hardness value of approximately 55A. The squeegee was located on the polishing blade so that it extended between 3/16" and ¼" beyond the polishing blade's leading or scraping edge. The length of the head and blades is determined only by the practicability of the tool. That is, for tool lengths greater than about three feet long, for example, snow removal becomes difficult because the tool will be difficult to push.

The about 120° obtuse angle selected for the V-shape was found to be optimal for use of the tool for snow and ice removal when the tool handle is held parallel to the airfoil surface. As the snow fills the "V", its weight gives enough bite to the blade to permit use of extended handle lengths without having to exert difficult and tiring downward force on the handle to keep the blade on the airfoil surface. The V-shaped head then serves as a nonscratching shovel for snow and slush removal in addition to a frost and ice scraper. When the angle was significantly increased the tool was found to chatter significantly. Further, when the angle was decreased, the tool operated much less effectively for removal of crusty snow and ice because the blade did not dig in as well. The polishing and squeegee blades come into action by rotating the handle 180° from the position it has when the stiff blade is in use. As mentioned hereinabove, the polishing blade is most efficient when used in an approximately perpendicular orientation to the airfoil surface.

It should be mentioned at this point that the stiffer blade member described hereinabove might be made an integral part of the head as described in FIGS. 5 and 6. That is, the head may be made of the same material as the stiffer blade and fashioned in such a way that one of its outer edges forms the scraping member. The head may be made relatively thick compared to the blade member or ribbed to attain the requisite rigidity and strength. The handle fastening arrangement may also require stiffening and additional strength in this embodiment of my tool. It is contemplated that at least one stiffening member would be included in the head design which member radiates from the intersection of the handle fastener and the second rectangular region and which member is rigidly attached to both the second rectangular region and the handle fastening means on the side of the second rectangular region outside the "V". It is further contemplated that the head, the handle fastening means, the rib, the stiffening member(s), and the stiffer blade member all be fabricated from the same material.

Additionally, it was found that all of the blades work best with square edges; that is, edges squared-off relative to the flat sheet surfaces. The materials employed cannot generally retain sharpened edges. Finally, it should be noted that 'Hytrel' polyester is solvent insensitive. This is an important characteristic, since the efficiency of my tool can be increased by use of chemical deicing agents to augment the mechanical precipitation removal capability provided by the present invention.

The foregoing description of two preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A tool operable with a handle for removing crusty frost, snow, slush, freezing rain, and light ice from aircraft airfoil surfaces, and for removing and polishing frost thereon without damaging said surfaces, which comprises in combination:
   a. a substantially rigid rectangular frame having a first outer edge and a second outer edge wherein said first outer edge and said second outer edge are substantially parallel to each other, and wherein said frame is bent at an obtuse angle along an inner line substantially parallel to said first outer edge and second outer edge so as to form a first rectangular region containing said first outer edge and a second rectangular region containing said second outer edge;
   b. a first scraping member for removing crusty frost, snow, and light ice from said airfoil surfaces, said first scraping member being relatively stiff and having a scraping edge and a second edge parallel to thereto and opposite said scraping edge, and comprising a rectangular sheet fabricated from at least one material having a room temperature Durometer hardness value included within the range from approximately 63D to 72D, wherein said hardness value changes by less than about 10% over the temperature range from approximately 0° to −40° C., said material further having a room temperature Clash-Berg Modulus of Rigidity included within the range from about 13,500 to 19,000 psi, wherein said modulus changes by less than a factor of about seven (7) over the temperature range from approximately +23° to −40° C.;
   c. means for substantially rigidly and demountably locating said first scraping member onto said first rectangular region such that said first scraping member extends outward with respect to said inner line and beyond said first outer edge;
   d. a second scraping member for polishing frost on said airfoil surfaces said second scraping member being more flexible than said first scraping member and having a scraping edge and a second edge parallel thereto and opposite said scraping edge and comprising a rectangular sheet fabricated from at least one material having a room temperature Durometer hardness value included within the range from approximately 40D to 55D, wherein said hardness value changes by less than about 13% over the temperature range from approximately 0° to −40° C., said material further having a room temperature Clash-Berg Modulus of Rigidity included within the range from about 2100 to 8800 psi, wherein said modulus changes by less than a factor of four (4) over the temperature range from approximately +23° to −40° C.; and
   e. means for substantially rigidly and demountably locating said second scraping member onto said second rectangular region such that said sraping member extends outward with respect to baid inner line and beyond said second outer edge.

2. The tool as described in claim 1, wherein a handle is provided for operating said tool, wherein means are provided for attaching said handle in a substantially perpendicular manner to said second rectangular region, and wherein said handle is disposed in a direction away from said obtuse angle.

3. The tool as described in claim 2, wherein said means for rigidly and demountably locating said first scraping member and said second scraping member onto said first rectangular region and said second rectangular region, respectively, comprises:
   a. a first rectangular clamping member removably fastened to said first rectangular region such that one edge of said first clamping member lies substantially parallel to and along said first outer edge, and said first scraping member is clamped between said first clamping member and said first rectangular region;
   b. a second rectangular clamping member removably fastened to said second rectangular region such that one edge of said second clamping member lies substantially parallel to and along said second outer edge, and said second scraping member is clamped between said second clamping member and said second rectangular region; and
   c. means for removably fastening said first clamping member to said first rectangular region, and for removably fastening said second clamping member to said second rectangular region.

4. The tool as described in claim 3, wherein said obtuse angle is approximately 120°.

5. The tool as described in claim 4, wherein said first clamping member is mounted on the side of said first rectangular region which lies inside said obtuse angle and said second clamping member is mounted on the side of said second rectangular region which lies inside said obtuse angle.

6. The tool as described in claim 5, wherein said means for removably fastening said first clamping member and said second clamping member to said first rectangular region and said second rectangular region, respectively, further comprises a plurality of screws disposed in a row substantially parallel to and away from said first outer edge and said second outer edge, clearance holes being provided in all of said first rectangular region, said second rectangular region, said first scraping member, and said second scraping member, said first clamping member and said second clamping member having tapped holes to receive said screws.

7. The tool as described in claim 6, wherein said first scraping member is slotted from said clearance holes to said second edge of said first scraping member, and said second scraping member is slotted from said clearance holes to said second edge of said second scraping member to allow insertion of said first scraping member between said first clamping member and said first rectangular region, and said second scraping member between said second clamping member and said second rectangular region without removal of said screws, said slots being "V"-shaped and slightly undersized substantially near the apex of the "V's" in order to permit said screws to be tightened while said first scraping member and said second scraping member remain in place.

8. The tool as described in claim 7, wherein means are provided for removably and rigidly fastening a softer squeegee member having a scraping edge to at least one side of said second scraping member for removing water and slush from the surfaces of interest, and for whisking solid precipitation loosened by the application of said first and second scraping members from said surfaces, said squeegee member comprising a rectangular sheet fabricated from at least one material having a room temperature Durometer hardness value in the range from approximately 40A to 60A, and having a width such that, when in place, said squeegee member extends beyond said scraping edge of said second scraping member.

9. The tool as described in claim 8, wherein said first scraping member and said second scraping member are fabricated from DuPont 'Hytrel' polyester elastomers.

10. The tool as described in claim 9, wherein said squeegee member is fabricated from Dow Corning Corporation silicone rubber.

11. The tool as described in claim 10, wherein said first rectangular region is between ½" and 4" wide in its shorter dimension, and said first scraping member extends beyond said first outer edge by between about ½" and 4", said first scraping member being between approximately 0.060" and 0.240" thick, wherein said second rectangular region is between ½" and 4" wide in its shorter dimension, and said second scraping member extends beyond said second outer edge by between 1" and 4", said second scraping member being between approximately 0.060" and 0.240" thick, and wherein said squeegee member extends beyond said scraping edge of said second scraping member by between about ½" and 1", said squeegee member being between approximately ⅛" and 3/16" thick.

12. The tool as described in claim 11, wherein said scraping edge of said first scraping member is squared-off, wherein said scraping edge of said second scraping member is squared-off, and wherein said scraping edge of said squeegee member is squared-off to permit said first scraping member, said second scraping member, and said squeegee member to ride over rivets and other small protrusions on said airfoil surfaces effectively and without damage thereto.

13. A tool operable in cooperation with a handle for removing crusty frost, snow, slush, freezing rain, and light ice from aircraft airfoil surfaces, and for removing and polishing frost thereon without damaging these surfaces, which comprises in combination a first rectangular region and a second rectangular region joined along their major dimensions at an obtuse angle forming a frame having an inner line and having a first outer edge and a second outer edge wherein said first outer edge and said second outer edge are substantially parallel to each other and to said inner line, said first rectangular region including said first outer edge and said second rectangular region including said second outer edge, and including items (b)–(e) as recited in claim 1.

14. The tool as described in claim 13, wherein a handle is provided for operating said tool, wherein means are provided for attaching said handle in a substantially perpendicular manner to said second rectangular region, and wherein said handle is disposed in a direction away from said obtuse angle.

15. The tool as described in claim 14, wherein said means for rigidly and demountably locating said first scraping member and said second scraping member onto said first rectangular region and said second rectangular region, respectively, further comprises:

a. a first rectangular clamping member removably fastened to said first rectangular region such that one edge of said first clamping member lies substantially parallel to and along said first outer edge and said first scraping member is clamped between said first outer clamping member and said first rectangular region;

b. a second rectangular clamping member removably fastened to said second rectangular region such that one edge of said second clamping member lies substantially parallel to and along said second outer edge and said second scraping member is clamped between said second clamping member and said second ractangular region; and c. means for removably fastening said first clamping member to said first rectangular region, and for removably fastening said second clamping member to said second rectangular region.

16. The tool as described in claim 15, wherein said obtuse angle is approximately 120°.

17. The tool as described in claim 16, wherein said first clamping member is mounted on the side of said first rectangular region which lies inside said obtuse angle and said second clamping member is mounted on the side of said second rectangular region which lies inside said obtuse angle.

18. The tool as described in claim 17, wherein said means for removably fastening said first clamping member and said second clamping member to said first rectangular region and said second rectangular region, respectively, further comprises a plurality of screws disposed in a row substantially parallel to and away from said first outer edge and said second outer edge, clearance holes being provided in all of said first rectangular region, said second rectangular region, said first scraping member and said second scraping member, said first clamping member and said second clamping member having tapped holes to receive said screws.

19. The tool as described in claim 18, wherein said first scraping member is slotted from said clearance holes to said second edge of said first scraping member, and said second scraping member is slotted from said clearance holes to said second edge of said second scraping member to allow insertion of said first scraping member between said first clamping member and said first rectangular region, and said second scraping member between said second clamping member and said second rectangular region without removal of said screws, said slots being "V"-shaped and slightly undersized near the apex of the "V's" in order to permit said screws to be tightened while said first scraping member and said second scraping member remain in place.

20. The tool as described in claim 19, wherein means are provided for removably and rigidly fastening a softer squeegee member having a scraping edge to either side of scraping member for removing water and slush from the surfaces of interest, and for wisking solid precipitation loosened by the application of said first and said second scraping members from said surfaces, said squeegee member comprising a rectangular sheet fabricated from at least one material having a room temperature Durometer hardness value in the range from approximately 40A to 60A, and having a width such that, when in place, said squeegee member extends beyond said scraping edge of said second scraping member.

21. The tool as described in claim 20, wherein said first and said second scraping member are fabricated from DuPont 'Hytrel' polyester elastomers.

22. The tool as described in claim 21, wherein said squeegee member is fabricated from Dow Corning Corporation silicone rubber.

23. The tool as described in claim 22, wherein said first rectangular region is between ½" and 4" wide in its shorter dimension, and said first scraping member extends beyond said first outer edge by between ½" and 4", said first scraping member being between approximately 0.060" and 0.240" thick, wherein said second rectangular region is between ½" and 4" wide in its shorter dimension, and said second scraping member extends beyond said second outer edge by between about 1" and 4", said second scraping member being between approximately 0.060" and 0.240" thick, and wherein said squeegee member extends beyond said scraping edge of said second scraping member by between about ⅛" and ¼", said squeegee member being between approximately ⅛" and 3/16" thick.

24. The tool as described in claim 23, wherein said scraping edge of said first scraping member is squared-off, wherein said scraping edge of said second scraping member is squared-off, and wherein said scraping edge of said squeegee member is squared-off which permits said first scraping member, said second scraping member, and said squeegee member to ride over rivets and other small protrusions on said airfoil surfaces effectively and without damage thereto.

25. A tool operable in cooperation with a handle for removing frost, snow, slush, freezing rain, and light ice from aircraft airfoil surfaces, and for removing and polishing frost thereon without damaging these surfaces, which comprises in combination:
 a. a substantially rigid rectangular frame having a first outer edge and a second outer edge wherein said first outer edge and said second outer edge are substantially parallel to each other, and wherein said frame is bent at an obtuse angle along an inner line substantially parallel to said first outer edge and said second outer edge so as to form a first rectangular region containing said first outer edge and a second rectangular region containing said second outer edge, said first rectangular region being a relatively stiff first scraping member for removing frost, snow, and light ice from said airfoil surfaces, said first outer edge being a scraping edge of said first scraping member, said frame and said first scraping member both being fabricated from at least one material having a room temperature Durometer hardness value included in the range from approximately 63D to 72D, wherein said hardness value changes by less than about 10% over the temperature range from approximately 0° to −40° C., said material further having a room temperature Clash-Berg Modulus of Rigidity included in the range from about 13,500 to 19,000 psi, wherein said modulus changes by less than a factor of about seven (7) over the temperature range from approximately +23° to −40° C.;
 b. a second scraping member for polishing frost on said airfoil surfaces which is more flexible than said first scraping member, said second scraping member having a scraping edge, and comprising a rectangular sheet fabricated from at least one material having a room temperature Durometer hardness value included in the range from approximately 40D to 55D, wherein said value changes by less than about 13% over the temperature range from approximately 0° to −40° C., said material further having a room temperature Clash-Berg Modulus of Rigidity included in the range from about 2100 to 8800 psi, wherein said modulus changes by less than a factor of about four (4) over the temperature range from approximately +23° to −40° C.; and
 c. means for rigidly and demountably locating said second scraping member onto said second rectangular region such that said second scraping member extends outward with respect to said inner line and beyond said second outer edge.

26. The tool as described in claim 25, wherein a handle is provided for operating said tool, wherein means are provided for attaching said handle in a substantially perpendicular manner to said second rectangular region, and wherein said handle is disposed in a direction away from said obtuse angle.

27. The tool as described in claim 26, wherein said obtuse angle is approximately 120°.

28. The tool as described in claim 27, wherein means are provided for removably and rigidly fastening a softer squeegee member having a scraping edge to at least one side of said second scraping member for removing water and slush from the surfaces of interest, and for whisking solid precipitation loosened by the application of said first and said second scraping members from said surfaces, said squeegee member comprisng a rectangular sheet fabricated from at least one material having a room temperature Durometer hardness value in the range from approximately 40A to 60A, and having a width such that, when in place, said squeegee member extends beyond said scraping edge of said second scraping member.

29. The tool as described in claim 28, wherein said first scraping member, said frame and said second scraping member are fabricated from DuPont 'Hytrel' polyester elastomers.

30. The tool as described in claim 29, wherein said squeegee member is fabricated from Dow Corning Corporation silicone rubber.

31. The tool as described in claim 30, wherein said first rectangular region is between 6" and 24" long, between approximately 0.060" and 0.240" thick, and between ½" and 4" wide in its shorter dimension, wherein said second scraping member is between 6" and 24" long, between 1" and 4" wide in its shorter dimension, and between approximately 0.060" and 0.240" thick, and wherein said squeegee member extends beyond said scraping edge of said second scraping member by between about ⅛" and ¼", and is between approximately ⅛" and 3/16" thick.

32. The tool as described in claim 31, wherein said frame has at least one rib substantially perpendicular to said inner line and adapted to connect said first rectangular region and said second rectangular region inside said obtuse angle in order to provide greater rigidity and strength to said frame, and wherein said handle attaching means includes at least one strengthening and stiffening member, said strengthening and stiffening member being rigidly attached to said handle attaching means and to said second rectangular region on the side of said second rectangular region directed away from said obtuse angle, said strengthening and stiffening member further being directed away from the place of intersection of said handle attaching means and said second rectangular region in a radial manner.

33. The tool as described in claim 32, wherein said scraping edge of said first scraping member is squared-off, wherein said scraping edge of said second scraping member is squared-off, and wherein said scraping edge of said squeegee member is squared-off to permit said first scraping member, said scraping member, and said second squeegee member to ride over rivets and other small protrusions on said airfoil surfaces effectively and without damage thereto.

* * * * *